United States Patent [19]

Taub

[11] 3,856,718

[45] Dec. 24, 1974

[54] MOLDED FLEXIBLE POLYURETHANE FOAMS

[75] Inventor: Bernard Taub, Williamsville, N.Y.

[73] Assignee: Allied Chemical Corporation, New York, N.Y.

[22] Filed: Sept. 18, 1972

[21] Appl. No.: 290,185

[52] U.S. Cl.................260/2.5 AQ, 260/2.5 AM, 260/2.5 AT, 260/2.5 AW, 260/77.5 NC
[51] Int. Cl....C08g 22/14, C08g 22/26, C08g 22/44
[58] Field of Search...260/2.5 AQ, 2.5 AW, 77.5 NC, 260/248 NS, 2.5 AM

[56] References Cited
UNITED STATES PATENTS

| | | | |
|---|---|---|---|
| 3,174,950 | 3/1965 | Cordier | 260/77.5 NC |
| 3,377,296 | 4/1968 | Dwyer | 260/2.5 AP |
| 3,467,606 | 9/1969 | Rice | 260/2.5 AP |
| 3,523,918 | 8/1970 | Gonzalez | 260/2.5 AZ |
| 3,586,649 | 6/1971 | Cobbledick | 260/2.5 AZ |
| 3,595,814 | 7/1971 | Lloyd | 260/2.5 AP |
| 3,632,707 | 1/1972 | Rice | 260/2.5 AP |
| 3,730,923 | 5/1973 | Formaini | 260/2.5 AQ |

FOREIGN PATENTS OR APPLICATIONS

| | | | |
|---|---|---|---|
| 894,240 | 2/1972 | Canada | 260/2.5 AW |

Primary Examiner—Donald E. Czaja
Assistant Examiner—C. Warren Ivy
Attorney, Agent, or Firm—Michael S. Jarosz

[57] ABSTRACT

Cold molded one-shot polyurethane flexible, high resilient foams are prepared by conducting the reaction of a polyisocyanate with a certain polyether polyol in the presence of a catalyst, a blowing agent comprising water and a curing agent comprising, as the major component thereof, a certain isocyanurate polyol.

17 Claims, No Drawings

MOLDED FLEXIBLE POLYURETHANE FOAMS

BACKGROUND OF THE INVENTION

In the early years of molded flexible polyurethane foam development, a prepolymer or two-shot molding process was employed. This prepolymer process was objectionable for various reasons, including poor reproducibility or prepolymer quality, metering and mixing difficulties as a result of the viscous nature of the prepolymer and the water amine catalyst solution, instability in the pre-gel stage, and unduly long postcure of the foam.

With the introduction of organo-tin and amine catalysts and silicone surfactants, one-shot foam molding became possible. Hence, one-shot molded polyurethane foams conventionally may be prepared by admixing polyols and aromatic polyisocyanates, usually in the presence of a catalyst and a blowing agent. Curing of foams produced in such manner, however, requires that the mold employed be quickly heated to high temperatures, i.e., in excess of 300°F., usually by microwave or infrared heating, after charging of the mold with the foamable reaction mixture and maintaining the mold contents at said temperature for a period in excess of at least 10 minutes to ensure sufficient cure of the foam to permit removal thereof from the mold.

More recently, there has been developed a new type of molded polyurethane foam in which the foam can be processed at much lower temperatures. Terms such as "cold molding," "cold cure" and "high resilient" foam have been used in connection with such foam products. Such foam products not only exhibit desirable properties, such as a latex-like feel, high sag factor and improved fire retardancy, but the production thereof requires lower processing temperatures and shorter cure cycles.

To insure the obtainment of the high degree of reactivity required in the production of such cold molded foams and also to increase load bearing properties of the foam, curing agents, such as liquid aromatic diamines, polyols and ethanolamines, are included in most formulations. However, production of polyurethane foams from formulations containing aromatic and aliphatic diamines has been discouraged in many applications, for example, in the production of slab stock foam for use in furniture and automobile seating applications, due to the toxic nature of such compounds (aromatic diamines being known in exhibit carcinogenic activity and aliphatic diamines being characterized, in general, by high toxicity). In addition to the potential toxicological properties associated with both aliphatic and aromatic diamines, the use of such amines has tended to produce polyurethane foams which exhibit poor humid aging characteristics. Further, use of both aliphatic and aromatic polyols as potential curing or crosslinking agents in cold-mold applications has likewise met with little, if any success. Although polyurethane foams derived from formulations containing a diol as curing agent, exhibit acceptable load bearing, as well as tear strength and elongation properties, however, such foams are characterized, in general, by poor compression set properties. On the other hand, polyurethane foams derived from formulations containing a triol as curing agent exhibit acceptable compression set properties, but are poor in tear strength and elongation.

Accordingly, it is an object of the present invention to provide cold molded polyurethane foams which exhibit a combination of desirable properties including tensile strength, tear strength, elongation and compression set.

It is a further object of the present invention to provide cold molded polyurethane foams which exhibit, in addition to the above specified physical properties, improved humid aging characteristics.

A still further object of the present invention is to provide cold molded polyurethane foams which either are totally free of undesirable amine curing agents or which contain substantially reduced quantities thereof as compared with foams heretofore prepared by such procedures.

SUMMARY OF THE INVENTION

In accordance with the present invention, flexible polyurethane foams may be produced by the cold molded method which exhibit satisfactory tensile strength, tear strength and elongation properties while maintaining good compression sets and which exhibit improved humid aging characteristics. In addition, the polyurethane foams produced in accordance with the method of the present invention are free of undesirable amine curing agents or contain substantially reduced quantities thereof as compared with foams heretofore prepared.

It has now been found that flexible polyurethane foams as described may be prepared by effecting reaction between a polyisocyanate and a polyether polyol in the presence of a catalyst and a blowing agent while employing a curing agent comprising, as the major component thereof, a certain isocyanurate polyol. When a crude polyisocyanate is employed as the polyisocyanate component of the reaction mixture, the isocyanurate polyol may be employed as the sole curing agent, but when a distilled polyisocyanate is employed as the polyisocyanate component of the reaction mixture, a mixture of the isocyanurate polyol and a diamine is desirably employed as the curing agent. If desired, in accordance with the conventional operating practice in the polyurethane foam production field, other agents, such as stabilizers, pigments, fillers, flame retardants and the like may be added to the formulation.

DESCRIPTION OF THE INVENTION

The process according to the present invention requires the use of an effective amount of certain isocyanurate polyols, which may be termed tris (hydro[oxyalkylene])-isocyanurates, as curing agent for the polyurethane forming reactant components. The isocyanurate polyols useful in the present invention correspond to the formula:

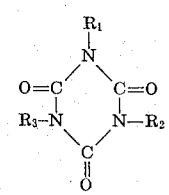

(Formula I)

wherein $R_1$ is a hydrogen-terminated oxyalkylene chain of from 2 – 10 oxyalkylene units, and $R_2$ and $R_3$ are each a hydrogen-terminated oxyalkylene chain of from 1 to 10 oxyalkylene units, wherein each oxyalkylene unit has the formula

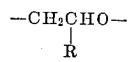

wherein R at each occurrence independently is hydrogen, methyl or ethyl. Particularly useful compounds employable in the present invention are of the formula:

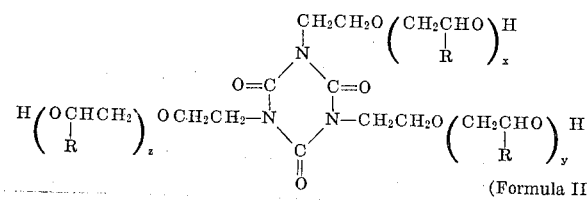

(Formula II)

wherein R is as designated in Formula I, x is an integer of from 1 to 9 and y and z are integers of from 0 to 9. Especially preferred compounds for use in the present invention are those isocyanurate polyols corresponding to Formula II above wherein x is 1 to 5 and y and z are 0 to 5. The isocyanurate polyols employable in the process of the present invention are known compounds and may be prepared by reacting the corresponding tris (2-hydroxyalkyl)isocyanurate with an appropriate amount of alkylene oxide at elevated temperatures, in the presence of an acid catalyst, as is more fully described in Canadian Pat. No. 894,240, issued Feb. 29, 1972, the disclosure of which is incorporated herein by reference. Although this patent indicates that certain isocyanurate polyols disclosed therein find use in the synthesis of polyurethane foams by reaction with diisocyanates, either with or without modifying diols or triols, in accordance with the present invention, it has been found that certain isocyanurate polyols, as defined, are particularly useful as curing agents in the production of cold molded foams, when employed with certain polyether polyols in an amount of from about 1 to 8 percent, preferably between about 2 and 6 percent, by weight, based on the weight of the polyether polyol. Mixtures of these isocyanurate polyols with other members of this class, as well as with curing agents normally employed in polyurethane flexible foam production may likewise be employed.

Preferred practice of the present invention requires that the isocyanurate polyols described be employed as sole curing agent. However, when the polyisocyanate reactant constitutes a distilled tolylene diisocyanate or an essentially pure mixture of the isomeric 2,4 and 2,6-tolylene diisocyanates, in order to ensure stable foam formation, the reaction is desirably conducted in the presence of a minor amount, generally, of from about 1 to 10 percent, based on the weight of the polyether polyol, of a primary polyamine auxiliary curing agent. In general, primary polyamine curing or extending agents are employed to replace a portion of the active hydrogen supplied by the polyether polyols employed as primary reactant with the polyisocyanate or by water employed as blowing agent. Illustrative polyamines for this purpose are aliphatic diamines such as ethylene diamines and menthane diamines and aromatic polyamines such as o-toluene diamines, m-phenylene diamines, 4,4'-methylene bis (2-methylaniline), 4,4'-methylene dianiline, as well as substituted derivatives of such arylene diamines which substituents are inert to isocyanate groups such as halo- and lower alkoxy-substituted derivatives thereof, for example, 3-chloro-4,4'-diaminodiphenylmethane.

As is well understood in the polyurethane foam art, any of a wide variety of organic polyisocyanates or mixtures thereof can be employed in the preparation of polyurethane foams. Typical of such suitable polyisocyanates m-phenylene diisocyanate; 2,4-tolylene diisocyanate; 2,6-tolylene diisocyanate; naphthalene-1,5-diisocyanate; 4,4'-methylene-bis-(phenylisocyanate); 1,3,5-benzene-triisocyanate; polyaryl-polyalkylene polyisocyanates such as a polymethylenepolyphenylisocyanate prepared by the phosgenation of the reaction product between aniline and formaldehyde having a functionality of 2.2 or greater, generally, 2.2 to about 3.5 as are more fully described in U.S. Pat. Nos. 2,683,730 and 3,362,979.

The preferred isocyanate component used in the present invention, however, comprises a toluene diamine phosgenation reaction product or a modified product thereof having a minor amount of a difunctional active hydrogen containing compound incorporated therein, said products having an amine equivalent within the range of about 90 to 125. By "undistilled toluene diamine phosgenation product" is meant the reaction product of a mixture of essentially 2,4- and 2,6-toluene diamines with phosgene from which product essentially all of the reaction solvent, if present during the phosgenation reaction, has been removed by distillation and from which none or up to a major portion of the tolylene diisocyanate has been removed by distillation. Such products may contain up to 90 percent by weight of volatile aromatic polyisocyanate, i.e., aromatic polyisocyanate separable from the composition by distillation. Undistilled toluene diamine phosgenation reaction products of this class and modified products thereof are described in U.S. Pat. Nos. 3,316,286 and 3,341,462, respectively, the disclosures of which are incorporated herein by reference. If desired, the undistilled toluene diamine phosgenation products can be diluted with up to about 85 percent by weight of distilled tolylene diisocyanate or a mixture of the isomeric 2,4 and 2,6-tolylene diisocyanates.

The polyol component required to be used in the process of the present invention is a polyalkylene ether triol or diol mixture thereof, having a number average molecular weight between about 3,000 and 7,500, preferably between about 4,500 to 6,700, and generally having a hydroxyl number between about 25 and 100. Polyether polyols of this type are conventionally obtained by reaction of an alkylene oxide, for example, ethylene oxide, propylene oxide, butylene oxide, trimethylene oxide or a mixture of two or more thereof, with a polyhydric alcohol such as ethylene glycol, propylene glycol, dipropylene glycol, glycerol, tetramethylene glycol, trimethylolpropane or mixtures thereof.

Polyether polyols derived from 1,2-propylene oxide and mixtures of 1,2-propylene oxide with ethylene oxide contain a major proportion of secondary hydroxyl groups and only a minor proportion of the more reactive primary hydroxy groups. The reactivity of the polyol can be enhanced by reacting such polyols containing essentially secondary hydroxyl groups with ethylene oxide, or 1,3-propylene oxide and thereby obtain a polyether polyol having an increased proportion of primary hydroxyl groups. Such polyols are known in this art as "capped" or "tipped" polyether polyols and are particularly suited for use in the process of the present invention.

The novel flexible urethane structures of the present invention are prepared in the presence of a blowing agent comprising water, which by in situ reaction with the isocyanate component produces carbon dioxide. This gas assists in the foaming step producing the cellular structure. This reaction also results in urea linkages which contributes crosslinking sites and thus gives strength and load bearing properties to the urethane polymer. If desired, an auxiliary blowing agent, for example, methylene chloride, fluorocarbons and the like, may be added, primarily to provide lower density structures and a softer urethane product.

The amount of water can be varied within the range of about 1 to 10 percent, based on the weight of the polyether polyol. The auxiliary blowing agent, if employed, can be likewise present in an amount of up to about 10 percent by weight based on the weight of the polyol. The amount(s) of blowing agent(s) used will depend upon the characteristics, density, load bearing, etc. desired in the flexible structure being prepared.

The amount of the polyurethane foaming components used follows conventional practice in the preparation of such flexible cellular structures. In general, the amount of the polyisocyanate component used is sufficient to provide from about .9 to 1.2 isocyanate groups for each hydroxyl group present in the polyols and the water added to provide blowing agent (generally referred to as NCO:OH index), preferably the amount is such as to provide a slight excess, e.g., a NCO:OH index of about 1.01 to 1.10.

In accordance with conventional practice in the cellular polyurethane art, various catalysts or accelerators may be employed in the foam-forming reaction. Examples of compounds for use as accelerators or catalysts in polyurethane foam formation include conventional tertiary amine catalysts, such as triethylamine, N-methylmorpholine, N-ethylmorpholine, triethylenediamine, N,N,N', N'-tetramethyl-1, 3-butanediamine, and trimethylaminoethylpiperazine, and catalysts comprising a mixture of such an amine with a tertiary amine salt of an alkylarylsulfonic acid, containing from about 9 to about 15 carbon atoms in the alkyl chain as is disclosed in Canadian Pat. No. 857,351, issued Dec. 1, 1970, the disclosure of which is incorporated herein by reference. These catalysts and/or or accelerators may be used alone or mixtures thereof may be utilized to prepare the cellular polyurethanes of the present invention.

In further accordance with conventional practice in cellular polyurethane foam production, other materials which may conventionally be employed in the production of polyurethane foams according to the present invention include stabilizers, particularly organosilicones commercially available for this purpose, fillers, flame retardants, and pigments.

The novel polyurethane foams prepared according to the process of the present invention are characterized by having density in excess of 1.75 lbs./ft$^3$, a tensile strength of at least 12 psi, an elongation of at least 100%, a tear strength of at least 1.5 lbs/in., a sag factor of above about 2.5, a compression set at 50 percent after humid aging of not greater than 30.

To further illustrate the present invention and the manner in which it may be practiced, the following specific examples are set forth. In the examples, unless otherwise indicated, all parts and percentages are by weight, and the foams were evaluated by art recognized procedures as set forth in ASTM – 1564.

EXAMPLES I–IV

Molded foams of Examples I–III, inclusive, were prepared using tris(hydro-tri[oxyethyl]) isocyanurate of general Formula II wherein each of x, y and z is 2, having a molecular weight of 400, an equivalent weight of 131 and a viscosity at 75°F. of 60,000 cps, (commercially available from Allied Chemical Corporation as TE-400 S Polyol) as curing agent by blending in accordance with conventional "one-shot" cold mold laboratory procedure at 80°F. feed compositions in the proportions set forth in Table I below. Following blending, the resultant mixtures were poured into a 16 33 16 × 2inches aluminum mold preheated to 130°F. and allowed to foam. The foam of Example IV was prepared by blending the feed composition under high speed agitation for 10 seconds in a Martin Sweets Laboratory foam machine, pouring the resultant mixture into a 15 × 15 × 4.5inches aluminum mold preheated to 130°F. and then permitting said mixture to foam. The foams were then heated at 130°F. for 15 minutes, demolded and crushed. Table I below summarizes the compositions and properties of the foams so produced, all of the foams being evaluated one week after preparation.

TABLE I

| COMPOSITION | I | IA | EXAMPLES II | III | IV |
|---|---|---|---|---|---|
| Polyether Triol of 4500 mol. wt. having 50% primary hydroxyl groups | 100 | 100 | 100 | 100 | 100.0 |
| TE-400 S Polyol | — | 4.5 | 4.5 | 4.5 | 4.5 |
| Water | 2.7 | 2.7 | 2.7 | 2.7 | 2.7 |
| Y-6454 Silicone[1] | 1.0 | 1.0 | 1.0 | 1.0 | 1.0 |
| Dabco 33LV[2] | 0.6 | 0.6 | 0.6 | 0.6 | — |
| Niax A-13 | 0.1 | 0.1 | 0.1 | 0.1 | 0.1 |
| Nacconate 5050[4] | 40 | 44.5 | — | — | — |
| Hylene TCPA5 | — | — | 41.5 | — | — |
| Nacconate 5050/80[6] | — | — | — | 40.5 | 39.9 |
| Isocyanate Index | 1.05 | 1.05 | 1.05 | 1.05 | 1.05 |
| PROPERTIES | | | | | |
| Density, lbs/cu.ft. | 3.0 | 3.1 | 3.0 | 3.2 | 2.62 |
| Tensile Strength, psi | 23.2 | 26.3 | 24.5 | 25.2 | 18.0 |
| Elongation, % | 160 | 150 | 150 | 165 | 175 |
| Tear Strength, lbs/in. | 2.2 | 1.9 | 1.4 | 1.9 | 1.5 |

TABLE I—Continued

| COMPOSITION | I | IA | EXAMPLES II | III | IV |
|---|---|---|---|---|---|
| Indentation Load Deflection at 25%, lbs. | 24 | 36 | 31 | 32 | 27.3 |
| Indentation Load Deflection at 65%, lbs. | 71 | 100 | 86 | 87 | 80.0 |
| Sag Factor | 2.9 | 2.8 | 2.8 | 2.7 | 2.93 |
| Indentation Load Deflection at 25% Return | 19 | 29 | 26 | 25 | 23.0 |
| Return, % | 79 | 80 | 84 | 79 | 84 |
| Rebound, % | 53 | 50 | 55 | 56 | 56 |
| Compression Set at 75%, % | 70+ | 70+ | 70+ | 32 | 10 |

[1] organosilicone block copolymer (commercially available from Union Carbide Corporation
[2] a 33% solution of triethylenediamine in dipropylene glycol
[3] Bis(2,2l-dimethylamino)diethyl ether
[4] crude tolylene diisocyanate having an amine equivalent of 107
[5] crude tolylene diisocyanate having an amine equivalent of 100
[6] a 50/50 mixture of (a) crude tolylene diisocyanate having an amine equivalent of 107 and (b) an 80/20 mixture of 2,4- and 2,6-tolylene diisocyanates, said mixture having an amine equivalent of 97.

The results set forth in Table I above demonstrate the use of a typical isocyanurate polyol with various polyisocyanate compositions in accordance with the process of the invention.

EXAMPLE V – VIII

The method of Examples I – III was repeated using the compositions set forth in Table II below:

TABLE II

| COMPOSITION | V | EXAMPLES VI | VII | VIII |
|---|---|---|---|---|
| Thanol 4501[7] | 100 | 100 | — | — |
| Pluracol 380[8] | — | — | 100 | 100 |
| TE-400S Polyol | 4.5 | — | 3.1 | — |
| Amine Curing Agent[9] | — | 5.0 | — | 3.6 |
| Water | 2.7 | 2.7 | 2.7 | 2.7 |
| Y-6454 Silicone[1] | 1.0 | 1.0 | 1.0 | 1.0 |
| Dabco 33LV[2] | 0.6 | — | — | — |
| Niax A-13 | 0.1 | 0.1 | 0.1 | 0.1 |
| Accure C[10] | — | 0.8 | 0.8 | 0.8 |
| Hylene TCPA[5] | 42.0 | 47.0 | 38.5 | 43.5 |
| Isocyanate Index | 1.05 | 1.0 | 1.05 | 1.05 |
| PROPERTIES | | | | |
| Density, lbs/cu. ft. | 3.2 | 3.2 | 3.1 | 2.7 |
| Tensile Strength, psi | 25.4 | 27.1 | 22.1 | 23.1 |
| Elongation, % | 135 | 120 | 180 | 150 |
| Tear Strength, lbs./in. | 1.8 | 1.9 | 2.5 | 2.4 |
| Indentation Load Deflection @ 25%, lbs. | 38 | 37 | 27 | 27 |
| Indentation Load Deflection @ 65%, lbs. | 107 | 115 | 71 | 79 |
| Sag Factor | 2.8 | 3.1 | 2.6 | 2.9 |
| Indentation Load Deflection @ 25% Return, lbs. | 31 | 30 | 23 | 23 |
| Return, % | 82 | 82 | 85 | 85 |
| Rebound, % | 50 | 55 | 55 | 62 |
| Compression Set @ 90% | 80+ | 80+ | 80+ | 80+ |
| Compression Set @ 50% | 32 | 29 | 22 | 16 |
| Compression Set @ 50% humid aged | 26 | 46 | 23 | 42 |

[7] a polyether triol having a molecular weight of 4500, a hydroxyl number of 36, a viscosity of 900 cps at 25°C. and having at least 50% primary hydroxyl groups (commercially available from Jefferson Chemical Corporation).
[8] a polyether triol having a molecular weight of 6700, a hydroxyl number of 25, a viscosity of 1400 cps at 25°C., and having at least 50% primary hydroxyl groups (commercially available from BASF-Wyandotte Corporation).
[9] a 50/50 mixture of triethanolamine and 4,4'-methylene dianiline.
[10] tertiary amine-alkylbenzene sulfonic acid neutralized catalyst, described in Example 1 of Canadian Patent 857,351.

The results set forth above clearly demonstrate the superiority of isocyanurate polyols employed in the process of the present invention with respect to humid aging characteristics as compared with an amine curing agent conventionally employed in commercial practice.

EXAMPLES IX – XII

The method of Examples I – III was repeated using the compositions set forth in Table III below:

TABLE III

| COMPOSITIONS | IX | EXAMPLES X | XI | XII |
|---|---|---|---|---|
| Polyether Triol of 4500 mol. wt. having 50% primary hydroxyl groups | 100 | 100 | 100 | 100 |
| TE-400₁₁S Polyol | 4.0 | 3.0 | 1.5 | — |
| LD-813 | 1.0 | 2.0 | 3.5 | 5.0 |
| Water | 2.7 | 2.7 | 2.7 | 2.7 |
| Y-6454 Silicone[1] | 1.0 | 1.0 | 1.0 | 1.0 |
| Dabco 33LV[2] | 0.6 | 0.6 | 0.6 | 0.6 |
| Niax A-1[3] | 0.05 | 0.05 | 0.05 | 0.05 |
| Nacconate 80[12] | 36.5 | 36.5 | 36.5 | 36.5 |
| Index | 1.05 | 1.05 | 1.05 | 1.05 |
| PROPERTIES | | | | |
| Density, lbs/cu.ft. | 3.2 | 3.0 | 3.0 | 2.9 |
| Tensile Strength, psi | 20.8 | 24.8 | 27.0 | 29.8 |
| Elongation, % | 140 | 155 | 155 | 170 |
| Tear Strength, lbs./in. | 1.6 | 2.0 | 1.9 | 2.4 |
| INdentation Load Deflection at 25%, lbs. | 33 | 33 | 35 | 34 |
| Indentation Load Deflection at 65%, lbs. | 90 | 103 | 106 | 101 |
| Sag Factor | 2.7 | 2.8 | 3.0 | 3.0 |
| Indentation Load Deflection at 25% Return, lbs. | 28 | 28 | 29 | 29 |
| Return, % | 85 | 85 | 83 | 85 |
| Rebound, % | — | 50 | 53 | 56 |
| Compression Set at 75% | 9 | 10 | 11 | 10 |
| Compression Set at 50% humid aged | 20 | 23 | 28 | 33 |

[11] commercially available crude arylene diamine reaction product resulting from the condensation of aniline and 2-chloro aniline with formaldehyde in the presence of a mineral acid, said product having an equivalent weight of 128.

[12] an 80/20 mixture of 2,4-tolylene diisocyanate and 2,6-tolylene diisocyanate.

Examples IX – XI demonstrate the use of a mixture of isocyanurate polyol with an aromatic amine curing agent in accordance with the process of the present invention, as well as the obtainment of foams by the process of the present invention having improved properties, after humid aging, as compared with foams produced by use of an arylene diamine curing agent (shown in Example XII).

I claim:

1. A polyurethane foam having a density in excess of 1.75 lb/ft³, a tensile strength of at least 12 psi, an elongation of at least 130%, a tear strength of at least 1.5 lb/in, a sag factor of above about 2.5, and compression set at 50%, after humid aging, of not greater than 30, prepared by the process comprising effecting reaction between an organic polyisocyanate selected from the group consisting of an undistilled toluene diamine phosgenation product, a polyaryl-polyalkylene polyisocyanate and a benzene triisocyanate, and a polyether p-olyol having a number average molecular weight between about 3,000 and 7,500 in the presence of a catalyst, a blowing agent comprising water and, as curing agent an isocyanurate polyol corresponding to the formula:

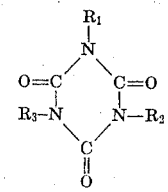

wherein $R_1$ is a hydrogen-terminated oxyalkylene chain of from 2 – 10 oxyalkylene units, and each of $R_2$ and $R_3$, which may be the same or different, is a hydrogen-terminated oxyalkylene chain of from 1 to 10 oxyalkylene units, wherein each oxyalkylene unit has the formula

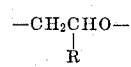

wherein R at each occurrence independently is hydrogen, methyl or ethyl, in an amount of from about 1 to 8 percent, by weight, based on the weight of the polyether polyol.

2. The foam of claim 1 wherein the polyisocyanate is a toluene diamine phosgenation product having an amine equivalent between about 90 and 125.

3. The foam of claim 2 wherein the polyether polyol is a polyethylene ether triol or diol or mixture thereof having a number average molecular weight between about 4,500–6,700.

4. The foam of claim 2 wherein the isocyanurate polyol employed as curing agent corresponds to the formula:

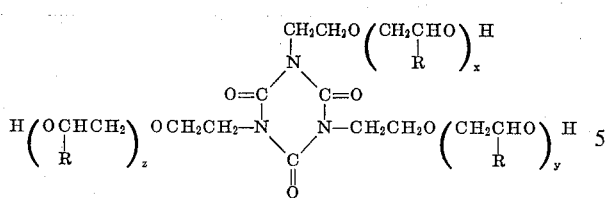

wherein R is as designated in claim 1, x is 1 to 9 and each of y and z is 0 to 9.

5. The foam of claim 4 wherein, in said formula, x is 1 to 5 and y and z are 0 to 5.

6. The foam of claim 4 wherein, in said formula, R is methyl and each of x, y and z is 1.

7. The foam of claim 4 wherein, in said formula, R is hydrogen and each of x, y and z is 1.

8. The foam of claim 1 wherein said reaction is conducted in the presence of a minor amount of a primary diamine as an auxiliary curing agent.

9. The foam of claim 8 wherein the primary diamine is present in amount of from about 1 to 10%, by weight, based on the weight of the polyether polyol.

10. A polyurethane foam having a density in excess of 1.75 lb/ft³, a tensile strength of at least 12 psi, an elongation of at least 130%, a tear strength of at least 1.5 lb/in, a sag factor of above about 2.5, and compression set at 50%, after humid aging, of not greater than 30, prepared by the process comprising effecting reaction between a tolylene diisocyanate and a polyether polyol having a number average molecular weight between about 3,000 and 7,500 in the presence of a catalyst, a blowing agent comprising water and as curing agent, an isocyanurate polyol corresponding to the formula:

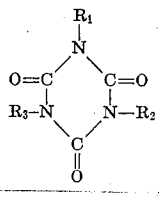

wherein $R_1$ is a hydrogen-terminated oxyalkylene chain of from 2 – 10 oxyalkylene units, and each of $R_2$ and $R_3$, which may be the same or different, is a hydrogen-terminated oxyalkylene chain of from 1 to 10 oxyalkylene units, wherein each oxyalkylene unit has the formula

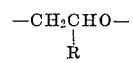

wherein R at each occurrence independently is hydrogen, methyl or ethyl, in an amount of from about 1 to 8 percent, by weight, based on the weight of the polyether polyol, and in the presence of a minor amount of a primary diamine as an auxiliary curing agent.

11. The foam of claim 10 wherein the primary diamine is present in amount of from about 1 to 10%, by weight, based on the weight of the polyether polyol.

12. The foam of claim 10 wherein the diisocyanate is a mixture of distilled isomeric 2,4 and 2,6-tolylene diisocyanates.

13. The foam of claim 12 wherein the polyether polyol is a polyethylene ether triol or diol or mixture thereof having a number average molecular weight between about 4,500–6,700.

14. The foam of claim 12 wherein the isocyanurate polyol employed as curing agent corresponds to the formula

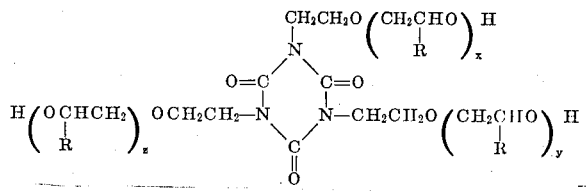

wherein R is as designated in claim 10, x is 1 to 9 and each of y and z is 0 to 9.

15. The foam of claim 14 wherein, in said formula, x is 1 to 5 and y and z are 0 to 5.

16. The foam of claim 14 wherein, in said formula, R is methyl and each of x, y and z is 1.

17. The foam of claim 14 wherein, in said formula, R is hydrogen and each of x, y and z is 1.

* * * * *